Patented Mar. 1, 1938

2,109,981

UNITED STATES PATENT OFFICE

2,109,981

PROCESS OF PREPARING POLYVINYL ESTERS

Arthur Voss, Kurt Eisfeld, and Heinrich Freudenberger, Frankfort-on-the-Main, Germany, assignors to I. G. Farbenindustrie Aktiengesellschaft, Frankfort-on-the-Main, Germany No Drawing. Application May 4, 1934, Serial No. 723,972. In Germany May 12, 1933

8 Claims. (Cl. 260—2)

The present invention relates to a process of preparing polyvinyl esters.

The usual methods of polymerizing vinyl esters by exposing the monomeric product in a concentrated condition to the action of heat or light, fail to work in many cases. It is, for instance, impossible to obtain the polymeric final product in one operation from vinyl-chloracetate by the usual thermal polymerization without producing products of inferior quality. Other esters, particularly esters of higher acids, too, often tend to the formation of insoluble polymerization products when polymerized alone; furthermore, insoluble polymerization products are readily obtained during the manufacture of mixed polymerization products.

In order to avoid the said difficulties, it has already been suggested that monomeric vinyl compounds should be emulsified in water and the emulsion subjected to the polymerization. This method of polymerizing involves the advantage that the reaction heat produced by the change can be better drawn off. Consequently the reaction can be better controlled. However, this method also fails to work in those cases where readily saponifiable vinyl esters are used, for instance in the case of vinyl chloracetate.

We have now found that these difficulties can be overcome in a simple manner by dispersing the monomeric vinyl esters in the aqueous solution of neutral electrolytes and polymerizing the ester in the dispersion. As neutral electrolytes of this kind there may be used particularly the salts of strong inorganic bases with strong acids, for instance sodium chloride, ammonium chloride, potassium sulfate, calcium chloride and others. It will be useful generally to select the neutral salts of the alkali metals. Salts of elements higher in the periodic system rapidly decrease in their suitability because firstly they are no longer sufficiently neutral and secondly the positive electrolyte—for instance heavy metal—has a detrimental action on the course of the polymerization. It is advisable to maintain the concentration of the solution of the metal salt not below 10 per cent.

Owing to the presence of the afore-named neutral salts it is possible to avoid to a large extent the saponification of the vinyl esters, as long as they are present in the monomeric condition. As soon as the polymeric condition is attained, saponification under the conditions of the polymerization need not be feared because it is more difficult to saponify the polymeric product than the monomeric product.

In order to promote the dispersion of the monomeric vinyl esters, there are employed those substances which are generally used as emulsifying agents, for instance Turkey red oil, the sodium salts of alkyl substituted naphthalene sulfonic acids, the sodium salts of reaction products of fatty acids of high molecular weight and hydroxy-substituted or amino-substituted alkyl sulfonic acids and others. If catalysts are used, the known catalysts generally applied during the polymerization of vinyl compounds are suitable.

Furthermore it is advisable to add to the solution of the neutral metal salt a small quantity of an organic solvent which serves as a "regulator" of the reaction and causes the formation of readily soluble polymerization products. The quantity of the "regulator" to be used is preferably kept between 0.2 and 1 per cent. calculated upon the monomeric vinyl ester. As "regulators" there are particularly suitable among others epichlorohydrine, dioxan, glycol, phenoxypropaneoxide, without this being a limitation, since other solvents may likewise be successfully employed.

By means of the process it is possible, without the afore-named difficulties, to convert all the vinyl compounds, even the halogen substituted fatty acid esters of the vinyl alcohol, into their polymeric products so that these valuable polymeric products can now be used for industrial purposes. Owing to the onerous manufacture this has hitherto been possible only to a limited extent.

In their properties the last named polymerization products obtainable according to the present invention resemble to a large extent the polymerization products hitherto produced only with the aid of polymerization by light. Furthermore, the new process involves the advantage that the course of the polymerization can be better conducted so that it is also possible, according to the conditions of the reaction used, such as temperature and additions, for instance catalysts, emulsifying agents, solvents, to vary the properties of the final product, for instance the viscosity or solubility.

The following examples serve to illustrate the invention, but they are not intended to limit it thereto, the parts being by weight:

1. Into a vessel having a good stirring device and a reflux apparatus and containing 400 parts of a sodium chloride solution of 25 per cent. strength to which have been added 2 parts of an emulsifying agent (for instance sulfonated fatty alcohol) there is gradually introduced, at 90° C., a mixture of 100 parts of vinylchloracetate, 0.5 part of benzoyl peroxide and 2 parts of dioxan. Polymerization immediately occurs, during which process the colorless polymerization product separates in the form of a coarse powder in a yield of 96 per cent. As soon as the addition which occurs drop by drop is complete, heating at 90° C. is continued for another hour. The reaction product is then filtered, washed with water and dried. The polymerization product obtained is a colorless resin which is as clear as glass. It may be used as a crude material for lacquers, as a spraying mass, a moulding material.

2. Into 200 parts of a solution of sodium chloride of 25 per cent. strength which contains 1.2 parts of sodium benzylnaphthalenesulfonate and 0.8 part of sodium hydroxy-dodecane-sulfonate there are introduced, drop by drop, while stirring, at a temperature of 90° C., 50 parts of vinyl chloracetate which contain 0.25 part of benzoylperoxide and 2 parts of epichlorohydrine. The polymerization soon sets in and is very quiet and uniform without the irregularities which occur during the polymerization of the ester by itself. Neither a saponification of the monomeric ester nor a discoloration of the polymerization product occur. After the addition of vinyl chloracetate which is carried out drop by drop is complete, the mixture is further polymerized for 1 hour at 90° C. The electrolyte solution is then decanted, the product is washed out and dried under reduced pressure. A completely uniform final product is thus obtained in one operation. The polymerization product is obtained as a colorless, fine-grained resin in a practically quantitative yield. The resin is readily soluble and without any residue in acetone and other ketones, chlorinated hydrocarbons, various esters and mixtures of solvents.

3. Into a vessel provided with a stirrer and a condenser and containing 100 parts of a calcium chloride solution of 21.5 per cent. strength to which has been added 1 part of an emulsifying agent, there is gradually introduced, drop by drop, at 90° C., a mixture of 25 parts of vinyl chloracetate and 0.12 part of benzoyl peroxide. The whole is then maintained for 1 hour at 90° C. The polymerization products separates nearly quantitatively in the form of a coarse-grained colorless resin. It is separated from the electrolyte solution, washed with water and dried. It possesses the same good solubility as the product obtained according to Example 2 and is suitable for the preparation of lacquers, particularly for electrical insulating purposes.

4. 40 parts of vinyl acetate and 120 parts of vinyl chloride are mixed with 0.5 part of acetyl peroxide; the mixture is kept in an autoclave with a solution of 20 parts of sodium chloride in 100 parts of water first for 6 hours at 50° C. and then for 6 hours at 80° C. The polymerization product is a white, finely pulverized mass which is washed out and dried. The product is readily soluble in acetone, aromatic hydrocarbons and only incompletely soluble in alcohol and hydrocarbons.

5. Into 300 parts of a sodium chloride solution of 25 per cent. strength which contains 1 per cent. of an emulsifying agent, there is gradually introduced, at 80° C., in a reflux apparatus, while stirring, a mixture of 60 parts of vinyl chloracetate, 43 parts of vinyl acetate and 0.5 part of benzoyl peroxide. The polymerization occurs quickly and regularly and is terminated in a quantitative manner by heating for 1½ hours at 80° C. The polymerization product is washed and dried under reduced pressure; it is obtained as a colorless, clear resin. It is soluble in acetone and other ketones, chlorinated hydrocarbons, esters and mixtures of solvents and may be used as a crude material for lacquers, as a moulding material and a spraying mass and as an adhesive substance. When the polymerization of the mixed components occurs under conditions other than those named insoluble products are obtained.

6. Into 200 parts of a sodium sulfate solution of 20 per cent. strength to which have been added 2 parts of a sulfonated fatty alcohol as an emulsifying agent there are gradually introduced at 80° C., while stirring, 50 parts of vinyl acetate with 0.25 part of benzoyl peroxide. By a further heating for 1½ hours at 80° C. the mixture is completely polymerized. The product is washed with water and dried and is then obtained in the form of a viscous, colorless resin which possesses the known properties and the solubility of polyvinyl acetate.

7. Into a solution of 2 parts of an emulsifying agent in 200 parts of a sodium chloride solution of 25 per cent. strength, there is gradually introduced at 80° C., while stirring, a mixture of 40 parts of vinyl acetate, 10 parts of vinyl dichloracetate and 0.25 part of benzoyl peroxide. In order to completely polymerize the mixture, heating is continued for 2½ hours. The polymerization product is obtained, after it has been watered and dried, in the form of a fine-grained, clear resin. It is soluble in acetone and other ketones, chlorinated hydrocarbons, benzene hydrocarbons, esters and mixtures of solvents.

We claim:

1. The process which comprises dispersing a normally saponifiable monomeric vinyl ester in the aqueous solution of a neutral reacting metal salt of at least 10% strength, whereby saponification of the vinyl ester is substantially avoided, and then effecting the polymerization.

2. The process which comprises dispersing a normally saponifiable monomeric vinyl ester in the aqueous solution of a neutral alkaline metal salt of at least 10% strength, whereby saponification of the vinyl ester is substantially avoided, and then effecting the polymerization.

3. The process which comprises dispersing a normally saponifiable monomeric vinyl ester in the aqueous solution of sodium chloride of at least 10% strength, whereby saponification of the vinyl ester is substantially avoided, and then effecting the polymerization.

4. The process which comprises dispersing a normally saponifiable monomeric vinyl ester in the aqueous solution of a neutral reacting metal salt of at least 10% strength, whereby saponification of the vinyl ester is substantially avoided, in the presence of an organic solvent and then effecting the polymerization.

5. The process which comprises dispersing a normally saponifiable monomeric vinyl ester in the aqueous solution of a neutral alkaline metal salt of at least 10% strength, whereby saponification of the vinyl ester is substantially avoided, in the presence of an organic solvent and then effecting the polymerization.

6. The process which comprises dispersing a normally saponifiable monomeric vinyl ester in the aqueous solution of sodium chloride of at least 10% strength, whereby saponification of the vinyl ester is substantially avoided, in the presence of an organic solvent and then effecting the polymerization.

7. The process which comprises dispersing a normally saponifiable monomeric vinyl ester of a lower carboxylic acid in the aqueous solution of a neutral reacting metal salt of at least 10% strength, whereby saponification of the vinyl ester is substantially avoided, in the presence of an organic solvent and then effecting the polymerization.

8. The process which comprises dispersing monomeric vinyl chloracetate in the aqueous solution of sodium chloride of at least 10 per cent. strength in the presence of epichlorohydrine and then effecting the polymerization.

ARTHUR VOSS.
KURT EISFELD.
HEINRICH FREUDENBERGER.